(12) United States Patent
Paluri et al.

(10) Patent No.: US 9,754,351 B2
(45) Date of Patent: Sep. 5, 2017

(54) SYSTEMS AND METHODS FOR PROCESSING CONTENT USING CONVOLUTIONAL NEURAL NETWORKS

(71) Applicant: Facebook, Inc., Menlo Park, CA (US)

(72) Inventors: Balamanohar Paluri, Menlo Park, CA (US); Du Le Hong Tran, Hanover, NH (US); Lubomir Bourdev, Mountain View, CA (US); Robert D. Fergus, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/983,477

(22) Filed: Dec. 29, 2015

(65) Prior Publication Data

US 2017/0132758 A1    May 11, 2017

Related U.S. Application Data

(60) Provisional application No. 62/251,414, filed on Nov. 5, 2015.

(51) Int. Cl.
*G06K 9/62* (2006.01)
*G06T 3/40* (2006.01)
(Continued)

(52) U.S. Cl.
CPC ........ *G06T 3/4046* (2013.01); *G06K 9/00744* (2013.01); *G06K 9/6232* (2013.01); *G06T 7/0065* (2013.01); *G06T 7/2066* (2013.01); *G06T 2207/10016* (2013.01); *G06T 2207/20081* (2013.01)

(58) Field of Classification Search
CPC . G06K 9/6232; G06T 3/4046; G06T 9/00744; G06T 2207/20081; G06T 2207/10016
See application file for complete search history.

(56) References Cited

U.S. PATENT DOCUMENTS 5,355,528 A * 10/1994 Roska .................. G06N 3/0635
                                                        706/29
6,549,879 B1 * 4/2003 Cullick ................... E21B 49/00
                                                        702/11

(Continued)

OTHER PUBLICATIONS

International Application No. PCT/US2015/068199, International Search Report and Written Opinion mailed Jul. 26, 2016.

(Continued)

*Primary Examiner* — Samir Ahmed
(74) *Attorney, Agent, or Firm* — Sheppard Mullin Richter & Hampton LLP

(57) ABSTRACT

Systems, methods, and non-transitory computer-readable media can obtain a set of video frames at a first resolution. Process the set of video frames using a convolutional neural network to output one or more signals, the convolutional neural network including (i) a set of two-dimensional convolutional layers and (ii) a set of three-dimensional convolutional layers, wherein the processing causes the set of video frames to be reduced to a second resolution. Process the one or more signals using a set of three-dimensional de-convolutional layers of the convolutional neural network. Obtain one or more outputs corresponding to the set of video frames from the convolutional neural network.

20 Claims, 8 Drawing Sheets

(51) Int. Cl.
*G06K 9/00* (2006.01)
*G06T 7/20* (2017.01)
*G06T 7/00* (2017.01)

(56) References Cited

U.S. PATENT DOCUMENTS

| | | | |
|---|---|---|---|
| 7,102,652 B2 * | 9/2006 | O'Donnell | G06T 15/503 |
| | | | 345/629 |
| 8,818,923 B1 * | 8/2014 | Hoffmann | G06F 17/30985 |
| | | | 706/18 |
| 9,171,247 B1 * | 10/2015 | Hoffmann | G06K 9/62 |
| 9,230,192 B2 * | 1/2016 | Jin | G06K 9/6267 |
| 9,330,171 B1 * | 5/2016 | Shetty | G06F 17/30784 |
| 2005/0131660 A1 * | 6/2005 | Yadegar | G06T 9/001 |
| | | | 703/2 |
| 2009/0070550 A1 * | 3/2009 | Solomon | G06F 15/803 |
| | | | 712/15 |
| 2009/0296985 A1 | 12/2009 | Lv et al. | |
| 2010/0214936 A1 | 8/2010 | Ito et al. | |
| 2011/0116711 A1 * | 5/2011 | Wang | G06K 9/4671 |
| | | | 382/165 |
| 2011/0182469 A1 | 7/2011 | Ji et al. | |
| 2012/0299945 A1 | 11/2012 | Aarabi | |
| 2014/0300758 A1 | 10/2014 | Tran | |
| 2015/0139536 A1 * | 5/2015 | Jin | G06K 9/6267 |
| | | | 382/156 |

OTHER PUBLICATIONS

European Patent Application No. 16176837.9, Search Report mailed Mar. 29, 2017.
Ji, Shuiwang et al., "3D Convolutional Neural Networks for Human Action Recognition," IEEE Transactions on Pattern Analysis and Machine Intelligence, vol. 35, No. 1, pp. 221-231, Jan. 2013.
Long, Jonathan et al., "Fully Convolutional Networks for Semantic Segmentation," 2015 IEEE Conference on computer Vision and Pattern Recogniation (CVPR), pp. 3431-3440, Jun. 7, 2015.
Tran, Du et al., "Deep End2End Voxel2Voxel Prediction," Nov. 20, 2015 [retrieved online at https://arxiv.org/pdf/1511.06681.pdf on Jun. 29, 2017].
Tran, Du et al., "Learning Spatiotemporal Features with 3D Convolutional Networks," Oct. 7, 2015 [retrieved online at https://arxiv.org/pdf/1412.0767.pdf on Jun. 29, 2017].
Yao, Li et al., "Describing Videos by Exploiting Temporal Structure," Oct. 1, 2015 [retrieved online at https://arxiv.org/pdf/1502.08029.pdf on Jun. 29, 2017].

* cited by examiner

SYSTEMS AND METHODS FOR PROCESSING CONTENT USING CONVOLUTIONAL NEURAL NETWORKS

CROSS-REFERENCE TO RELATED APPLICATIONS

This application claims priority to U.S. Provisional Patent Application No. 62/251,414, filed on Nov. 5, 2015 and entitled "SYSTEMS AND METHODS FOR PROCESSING CONTENT USING CONVOLUTIONAL NEURAL NETWORKS", which is incorporated herein by reference.

FIELD OF THE INVENTION

The present technology relates to the field of media processing. More particularly, the present technology relates to techniques for processing video content using convolutional neural networks.

BACKGROUND

Today, people often utilize computing devices or systems for a wide variety of purposes. For example, users can use their computing devices (or systems) to interact with one another, create content, share information, and access information. In some instances, a user of a computing device can utilize a camera or other image sensor of the computing device to capture or record media content, such as video content.

SUMMARY

Various embodiments of the present disclosure can include systems, methods, and non-transitory computer readable media configured to obtain a set of video frames at a first resolution. Process the set of video frames using a convolutional neural network to output one or more signals, the convolutional neural network including (i) a set of two-dimensional convolutional layers and (ii) a set of three-dimensional convolutional layers, wherein the processing causes the set of video frames to be reduced to a second resolution. Process the one or more signals using a set of three-dimensional de-convolutional layers of the convolutional neural network. Obtain one or more outputs corresponding to the set of video frames from the convolutional neural network.

In an embodiment, the systems, methods, and non-transitory computer readable media are configured to obtain one or more respective feature descriptors for one or more voxels in the set of video frames, wherein each feature descriptor references a recognized scene, object, or action.

In an embodiment, the systems, methods, and non-transitory computer readable media are configured to obtain a respective optical flow for one or more voxels in the set of video frames, wherein the optical flow for a voxel describes at least a predicted direction and magnitude of the voxel.

In an embodiment, the systems, methods, and non-transitory computer readable media are configured to obtain a respective depth measurement for one or more voxels in the set of video frames.

In an embodiment, the systems, methods, and non-transitory computer readable media are configured to input at least a portion of signals produced by the set of three-dimensional convolutional layers to the set of three-dimensional de-convolutional layers, the three-dimensional de-convolutional layers being trained to apply at least one three-dimensional de-convolutional operation to the portion of signals.

In an embodiment, the at least one three-dimensional de-convolutional operation is based at least on one or more three-dimensional filters to de-convolve the portion of signals, and wherein the three-dimensional de-convolutional operation causes the representation of the video content to be increased in signal size.

In an embodiment, the systems, methods, and non-transitory computer readable media are configured to input a representation of the set of video frames to the set of two-dimensional convolutional layers to output a set of first signals, the two-dimensional convolutional layers being trained to apply at least one two-dimensional convolutional operation to the representation of the video content, and to input at least a portion of the set of first signals to the set of three-dimensional convolutional layers to output a set of second signals, the three-dimensional convolutional layers being trained to apply at least one three-dimensional convolutional operation to the set of first signals.

In an embodiment, the at least one two-dimensional convolutional operation is based at least on one or more two-dimensional filters to convolve the representation of the video content, and wherein the two-dimensional convolutional operation causes the representation of the video content to be reduced in signal size.

In an embodiment, the at least one three-dimensional convolutional operation is based at least on one or more three-dimensional filters to convolve the set of first signals, and wherein the three-dimensional convolutional operation causes the representation of the video content to be reduced in signal size.

In an embodiment, the set of video frames includes more than two video frames.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
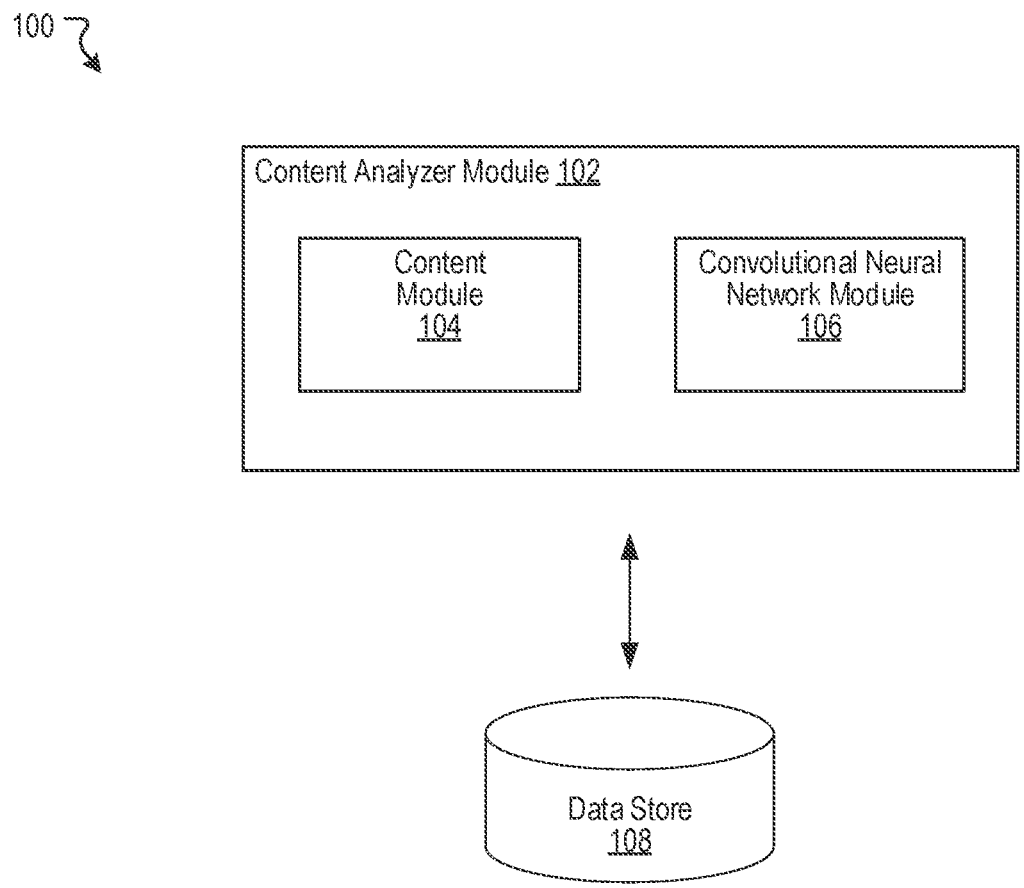
FIG. 1 illustrates an example system including an example content analyzer module configured to analyze video content using one or more convolutional neural networks, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Processing Content Using Convolutional Neural Networks

People use computing devices or systems for a wide variety of purposes. Computing devices can provide different kinds of functionality. Users can utilize their computing devices to produce information, access information, and share information. In some cases, computing devices can include or correspond to cameras capable of capturing or recording media content, such as videos. Videos can generally include a set of frames which can capture, or represent, various scenes, items, subjects, or other objects. A set of frames, taken consecutively or otherwise, can also capture various movements, actions, or other changes in appearance over time.

Conventional approaches to processing video content for various purposes such as semantic segmentation (e.g., feature recognition, such as recognizing scene, object, movement, etc.), optical flow, and depth recognition may be inefficient and/or unreliable. In one example, a conventional convolutional neural network may not be able to reliably recognize features in a set of video frames. Further, the size, or resolution, of the video content is typically reduced upon being processed by each of the different layers in the convolutional neural network, which contributes to such unreliability. Conventional approaches can also be limited in the sense that different configurations of convolutional neural networks may be needed so that the convolutional neural network can accurately perform a certain task, such as feature recognition, optical flow, depth recognition, to names some examples. Accordingly, such conventional approaches can provide for sub-optimal processing of video content and may not be effective in addressing these and other problems arising in computer technology.

An improved approach rooted in computer technology overcomes the foregoing and other disadvantages associated with conventional approaches specifically arising in the realm of computer technology. In various embodiments, a convolutional neural network having a set of two-dimensional convolutional layers, a set of three-dimensional convolutional layers, and a set of three-dimensional de-convolutional layers can be trained and utilized to perform various types of tasks including, for example, feature recognition, optical flow, and/or depth recognition. In some embodiments, the convolutional neural network can be trained to predict, for any voxel in a set of video frames, a corresponding set of feature descriptors, optical flow (e.g., a predicted direction and magnitude of the voxel), and/or depth recognition. In such embodiments, the set of video frames can be processed by the two-dimensional convolutional layers to output a set of first signals. This set of first signals can be processed by the three-dimensional convolutional layers to output a set of second signals. The set of second signals can be processed by the three-dimensional de-convolutional layers that are trained to upscale the size, or resolution, of the video content which may be reduced due to being processed by the two-dimensional and three-dimensional convolutional layers. The upscaled signals can be inputted to a softmax layer of the convolutional neural network to produce one or more outputs. The output can vary depending on the training of the convolutional neural network and the loss function utilized by the softmax layer. For example, the outputs can be one or more feature descriptors that indicate a recognized scene, object, or movement corresponding to a voxel in the set of video frames, a respective optical flow for a voxel in the set of video frames, or a respective depth recognized for a voxel in the set of video frames.

FIG. 1 illustrates an example system 100 including an example content analyzer module 102 configured to analyze video content using one or more convolutional neural networks (CNN), according to an embodiment of the present disclosure. As shown in the example of FIG. 1, the example content analyzer module 102 can include a content module 104 and a convolutional neural network module 106. In some instances, the example system 100 can include at least one data store 108. The components (e.g., modules, elements, etc.) shown in this figure and all figures herein are exemplary only, and other implementations may include additional, fewer, integrated, or different components. Some components may not be shown so as not to obscure relevant details.

In some embodiments, the content analyzer module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content analyzer module 102 can be implemented, in part or in whole, as software running on one or more computing devices or systems, such as on a user or client computing device. In one example, the content analyzer module 102 or at least a portion thereof can be implemented as or within an application (e.g., app), a program, or an applet, etc., running on a user computing device or a client computing system, such as the user device 710 of FIG. 7. In another example, the content analyzer module 102 or at least a portion thereof can be implemented using one or more computing devices or systems that include one or more servers, such as network servers or cloud servers. In some instances, the content analyzer module 102 can, in part or in whole, be implemented within or configured to operate in conjunction with a social networking system (or service), such as the social networking system 730 of FIG. 7.

The content analyzer module 102 can be configured to communicate and/or operate with the at least one data store 108, as shown in the example system 100. The at least one data store 108 can be configured to store and maintain various types of data. In some implementations, the at least one data store 108 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 108 can store information associated with users, such as user identifiers, user information, profile information, user specified settings, content produced or posted by users, and various other types of user data. In some embodiments, the at least one data store 108 can store media content including video content, which can be obtained by the content analyzer module 104. In some instances, the at least one data store 108 can also store training data for training one or more convolutional neural networks. In one example, the training data can include, for example, video content along with any labels, tags, attributes, properties, and/or descriptions for the video content. Such training data can be used to train a convolutional neural network for performing semantic segmentation (e.g., predicting feature descriptors) for a set of frames, for example. In another example, the training data can include one or more ground truth optical flow data sets that can be used to train a convolutional neural network for predicting the optical flow of a set of frames, such as respective directions and magnitudes for pixels, or voxels, corresponding to the set of frames. In another example, the training data can include one or more ground truth depth recognition data sets that can be used to train a convolutional neural network for predicting the depth for a set of frames. It should be appreciated that many variations are possible.

The content module 104 can be configured to obtain and/or receive video content to be analyzed. The video content may be a set of images or video frames, or video files, for example. In various embodiments, the video content may be provided (e.g., uploaded) by users of a social networking system and/or a content provider. In some embodiments, such video content may be stored in the data store 108 and the content module 104 can be configured to obtain the video content from the data store 108.

The convolutional neural network module 106 can be configured to analyze video content, such as video content provided by the content module 104. In various embodiments, the convolutional neural network module 106 can evaluate the video content using one or more convolutional neural networks that have each been configured to perform various tasks. Such tasks may involve predicting, for each voxel (i.e., a pixel in time), or at least a portion of the voxels, corresponding to the video content, respective semantic segmentations (e.g., video feature descriptors), optical flow (e.g., direction of movement and/or magnitude of the direction), and/or depth recognition, to name some examples. For example, a set of video frames may capture a cat jumping over a bicycle parked in the woods. Here, the convolutional neural network module 106 can train and utilize a convolutional neural network to semantically segment voxels in the set of video frames. When semantically segmenting voxels, the convolutional neural network module 106 can determine a set of feature descriptors corresponding to concepts identified in the set of video frames, together with the respective probabilities that such concepts exist in the set of video frames. In this example, the convolutional neural network module 106 may determine an 84 percent probability that a first voxel in the set of video frames represents a portion of a forest scene, a 96 percent probability that a second voxel in the set of video frames represents a portion of a cat object, and a 88 percent probability that a third voxel in the set of video frames represents a portion of a bicycle object, to provide some examples. As mentioned, in some embodiments, the convolutional neural network module 106 can determine such predictions for each voxel in the set of video frames. More details regarding the convolutional neural network module 106 will be provided below with reference to FIG. 2.

Figure 2:
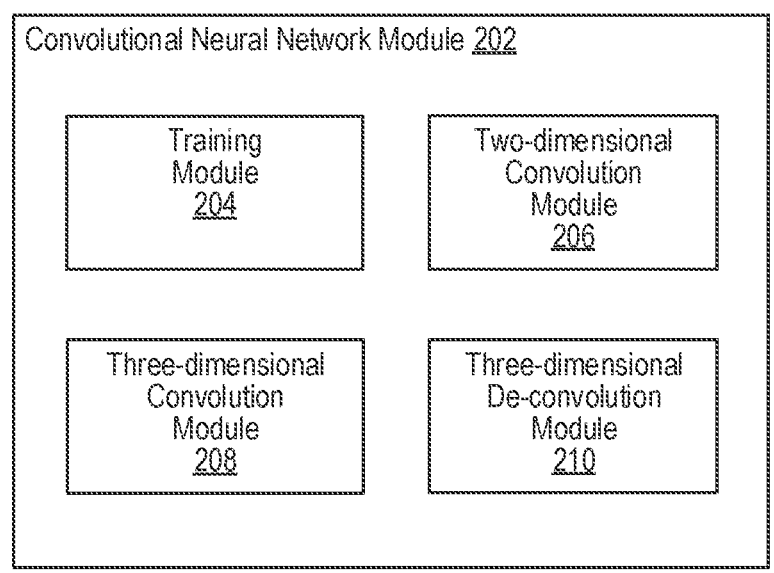
FIG. 2 illustrates an example neural network module configured to analyze video content, according to an embodiment of the present disclosure.

FIG. 2 illustrates an example convolutional neural network module 202 configured to analyze video content, according to an embodiment of the present disclosure. In some embodiments, the convolutional neural network module 106 of FIG. 1 can be implemented as the example convolutional neural network module 202. As shown in FIG. 2, the example convolutional neural network module 202 can include a training module 204, a two-dimensional convolution module 206, a three-dimensional convolution module 208, and a three-dimensional de-convolution module 210.

In various embodiments, the convolutional neural network module 202 can evaluate video content using one or more convolutional neural networks that have each been trained to perform certain tasks. Such tasks may involve predicting, for each voxel, or at least a portion of voxels, corresponding to the video content, respective semantic segmentations, optical flow, and/or depth recognition, for example. In some embodiments, a convolutional neural network can include one or more two-dimensional convolutional layers, one or more three-dimensional convolutional layers, one or more three-dimensional de-convolutional layers, and one or more pooling layers.

The training module 204 can be used to train the convolutional neural network by training one or more two-dimensional convolutional layers that can be utilized by the two-dimensional convolution module 206, one or more three-dimensional convolutional layers that can be utilized by the three-dimensional convolution module 208, and one or more three-dimensional de-convolutional layers that can be utilized by the three-dimensional de-convolution module 210. The convolutional neural network can be trained, for example, using the training module 204 to provide a certain type of output or prediction. In various embodiments, the output can be a prediction that corresponds to one or more voxels in video content. The prediction provided for the voxel can vary depending on the training of the convolutional neural network. The training module 204 can train the convolutional neural network to perform a certain task (e.g., semantic segmentation, optical flow, and/or depth recognition for a voxel) using ground truth training data that may be obtained, for example, from a data store (e.g., the data store 108 of FIG. 1). In some embodiments, when training the convolutional neural network to predict semantic segmentations, the training module 204 can utilize training data that includes video content that has been labeled (e.g., using social tags, descriptive tags, hashtags, etc.) to identify at least a scene, an object, and/or an action. In some embodiments, when training the convolutional neural network to predict optical flow, the training module 204 can utilize training data that includes ground truth optical flow outputs for various video content (e.g., a direction and magnitude for each voxel). In some embodiments, when training the convolutional neural network to predict depth recognition, the training module 204 can utilize training data that includes ground truth depth outputs for various video content.

To perform the training of the various layers (e.g., two-dimensional convolutional layer(s), three-dimensional convolutional layer(s), and/or two-dimensional de-convolutional layer(s)), the training module 204 can process any of the training data sets through the convolutional neural network. The convolutional neural network can produce a set of corresponding outputs for the training data. These outputs can be compared against the ground truth outputs included in the training data to measure any inaccuracies in the output produced by the convolutional neural network. In various embodiments, such inaccuracies can be reduced by performing a backpropagation through the convolutional neural network. During the backpropagation, the training module 204 can adjust one or more weight values of one or more filters associated with the various layers in the convolutional neural network in order to minimize the inaccuracies. By performing backpropagation over a number of training iterations, optimal, or otherwise suitable, weight values can be determined for the filters of the convolutional neural network. In some instances, each weight value for a filter can correspond to a pixel value (e.g., RGB value, HEX code, etc.) of the filter.

As mentioned, the convolutional neural network module 202 can process video content using a convolutional neural network that has been trained to perform a certain task. For example, the video content can be forward propagated through a convolutional neural network in an inference process to generate one or more outputs. In some embodiments, the convolutional neural network is trained to output feature descriptors for each voxel in the video content. The feature descriptors can provide a respective confidence percentage for each concept in a list of predefined concepts (e.g., scenes, objects, actions, etc.). The confidence percentage for a concept can indicate a likelihood whether the concept is recognized in the video content. In some embodiments, the convolutional neural network is trained to output an optical flow (e.g., direction and magnitude) for each voxel in the video content. In some embodiments, the convolutional neural network is trained to output a depth for each voxel in the video content. When processing video content, the two-dimensional convolution module 206 can be configured to apply at least one two-dimensional convolutional operation to the video content using one or more two-dimensional convolutional layers. A two-dimensional convolutional operation can utilize at least one two-dimensional filter to convolve the representation of the video content, which can cause the representation of the video content to be reduced in signal size. Each two-dimensional convolutional layer can apply a respective two-dimensional convolutional operation to its received input signals and can generate corresponding output signals that may be inputted into a subsequent layer during forward propagation. In some embodiments, the signals outputted from the two-dimensional convolutional layers are inputted to one or more three-dimensional convolutional layers.

The three-dimensional convolution module 208 can be configured to apply at least one three-dimensional convolutional operation to the video content using one or more three-dimensional convolutional layers. A three-dimensional convolutional operation can utilize at least one three-dimensional filter to convolve the representation of the video content, which can cause the representation of the video content to be reduced in signal size. Each three-dimensional convolutional layer can apply a respective three-dimensional convolutional operation to its received input signals and can generate corresponding output signals that may be inputted into a subsequent layer during forward propagation. In some embodiments, the signals outputted from the three-dimensional convolutional layers are inputted to one or more three-dimensional de-convolutional layers.

The three-dimensional de-convolution module 210 can be configured to apply at least one three-dimensional de-convolutional operation to the video content using one or more three-dimensional de-convolutional layers. A three-dimensional de-convolutional operation can utilize at least one three-dimensional filter to de-convolve the representation of the video content. Through training, this filter can learn the appropriate weights needed to upsample the video content. Each three-dimensional de-convolutional layer can apply a respective three-dimensional de-convolutional operation to its received input signals and can generate corresponding output signals that may be inputted into a subsequent layer during forward propagation. As mentioned, each convolutional operation can cause the size of the generated output signals to be reduced in relation to the received input signals. Thus, the outputs received from the three-dimensional convolution module 208 can be reduced in relation to the input signals originally received by the two-dimensional convolution module 206. In various embodiments, the three-dimensional de-convolution module 210 can upsample the input signals received by the three-dimensional convolution module 208 to match the input signals that were originally provided to the convolutional neural network module 202. In other words, the three-dimensional de-convolutional layers utilized by the three-dimensional de-convolution module 210 can be trained to increase the graphical resolution (e.g., pixel width and height) of the input signals received by the three-dimensional convolution module 208 to match the graphical resolution of the video content that was originally inputted to the convolutional neural network module 202. This upsampling can be done by training the three-dimensional de-convolutional layers to evaluate local structures of the video content and then increase the resolution to correspond to the resolution of the originally submitted video content.

Figure 3:
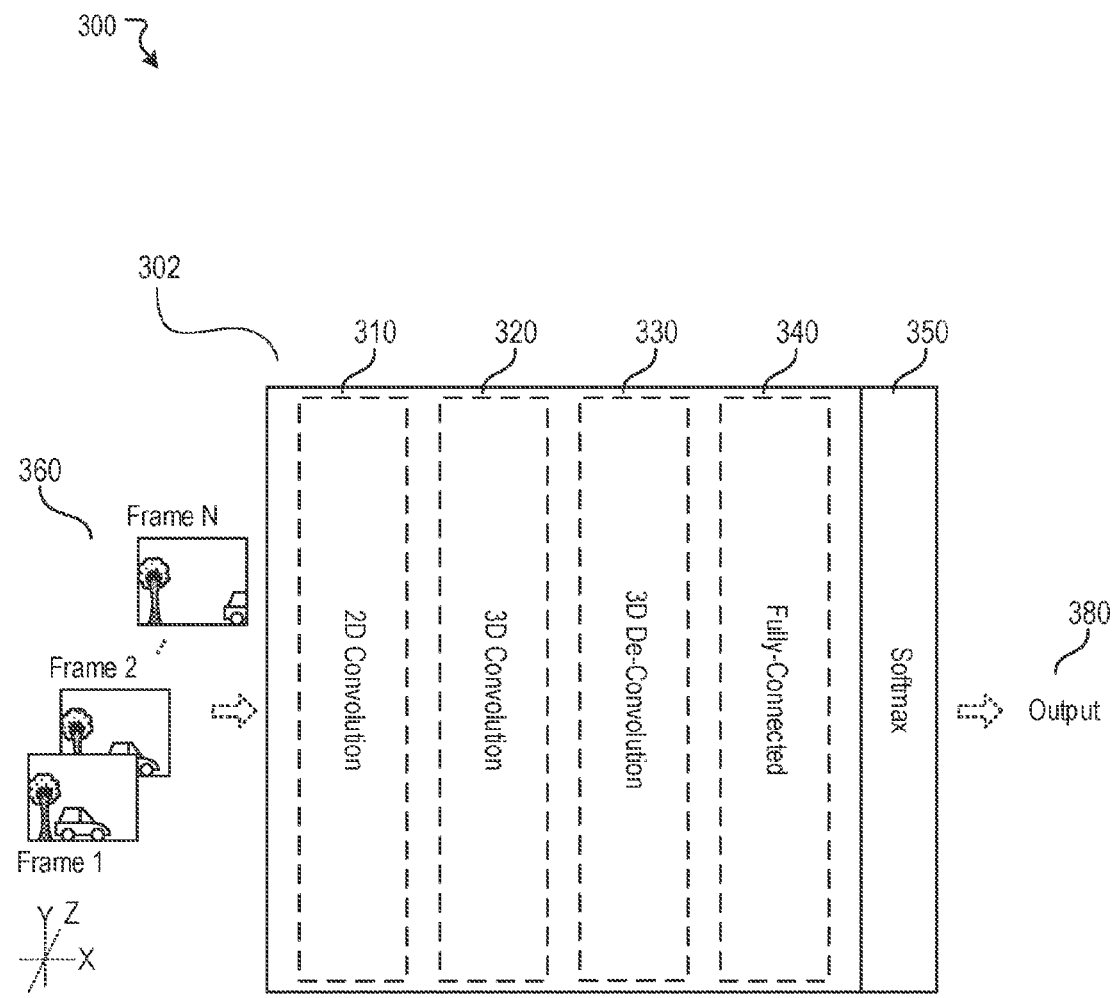
FIG. 3 illustrates an example diagram of a convolutional neural network, according to an embodiment of the present disclosure.

FIG. 3 illustrates an example diagram 300 of a convolutional neural network, according to an embodiment of the present disclosure. The example diagram 300 illustrates the structure of a convolutional neural network 302 that has been trained to perform a certain task. As mentioned, the convolutional neural network 302 can be trained to predict feature descriptors, optical flow, or depth, of some or all voxels in video content. As shown in FIG. 3, the example convolutional neural network 302 can include a set of two-dimensional convolutional layers 310, a set of three-dimensional convolutional layers 320, and a set of three-dimensional de-convolutional layers 330. The number of respective layers included in the two-dimensional convolutional layers 310, the three-dimensional convolutional layers 320, and the three-dimensional de-convolutional layers 330 can vary depending on the implementation. In some embodiments, the set of two-dimensional convolutional layers 310 can include at least five two-dimensional convolutional layers, the set of three-dimensional convolutional layers 320 can include at least three three-dimensional convolutional layers, and the set of three-dimensional de-convolutional layers 330 can include at least three three-dimensional de-convolutional layers. In some embodiments, the convolutional neural network 302 can include a set of fully-connected layers 340. Further, in some embodiments, the convolutional neural network 302 can include a softmax layer 350. At least a portion of each layer can be connected with at least a portion of another layer and information can be transmitted through the layers.

In some instances, during a forward propagation through the convolutional neural network, data describing video content 360 can be inputted to the first two-dimensional convolutional layer in the set of two-dimensional convolutional layers 310 to produce an output 380. The two-dimensional convolutional layers 310 can apply one or more two-dimensional convolutional operations to the representation of the video content 360. Each two-dimensional convolutional operation can utilize at least one two-dimensional filter to convolve the representation of the video content 360. The two-dimensional convolutional layers 310 can produce output signals upon performing the two-dimensional convolutional operations. These output signals can be inputted to the next layer in the convolutional neural network 302 during forward propagation. In this example, the output signals are inputted to the three-dimensional convolutional layers 320. The three-dimensional convolutional layers 320 can apply one or more three-dimensional convolutional operations to the input signals received from the two-dimensional convolutional layers 310. Each three-dimensional convolutional operation can utilize at least one three-dimensional filter to convolve the representation of the input signals. The three-dimensional convolutional layers 320 can produce output signals upon performing the three-dimensional convolutional operations. These output signals can be inputted to the next layer in the convolutional neural network 302 during forward propagation. In this example, the output signals are inputted to the three-dimensional de-convolutional layers 330. The three-dimensional de-convolutional layers 330 can apply one or more three-dimensional de-convolutional operations to the input signals received from the three-dimensional convolutional layers 320. Each three-dimensional de-convolutional operation can utilize at least one three-dimensional filter to de-convolve the representation of the input signals. The three-dimensional de-convolutional layers 330 can produce output signals upon performing the three-dimensional de-convolutional operations. These output signals can be inputted to the next layer in the convolutional neural network 302 during forward propagation. In some embodiments, some, or all, of the signals outputted from the three-dimensional de-convolutional layers are inputted to the set of fully-connected layers 340. One or more outputs 380 from the convolutional neural network 302 can be generated based on the signals outputted from the fully-connected layers 340. In some embodiments, the output(s) 380 can be normalized or adjusted by the softmax layer 350.

As mentioned, this output 380 can describe feature descriptors, optical flow, or depth, of some or all voxels in the video content. In some embodiments, the video content 360 inputted to the convolutional neural network 302 is a set of frames of some length (e.g., 16 frames corresponding to a portion of video content). In such embodiments, the output 380 produced by the convolutional neural network 302 is the same length as the inputted set of frames. Thus, for example, if the set of frames inputted to the convolutional neural network 302 were 16 frames in length, then the output 380 can provide information (e.g., semantic segmentation, optical flow, or depth) of length 16 frames. In some embodiments, the convolutional neural network 302 automatically provides a smooth trajectory across the number of frames without requiring additional smoothing. The loss function utilized, for example, by the softmax layer 350 can vary depending on the task (e.g., semantic segmentation, optical flow, depth recognition) for which the convolutional neural network 302 was trained to perform. In some embodiments, the resolution of the output 380 is the same as the resolution of the input 360.

Figure 4:
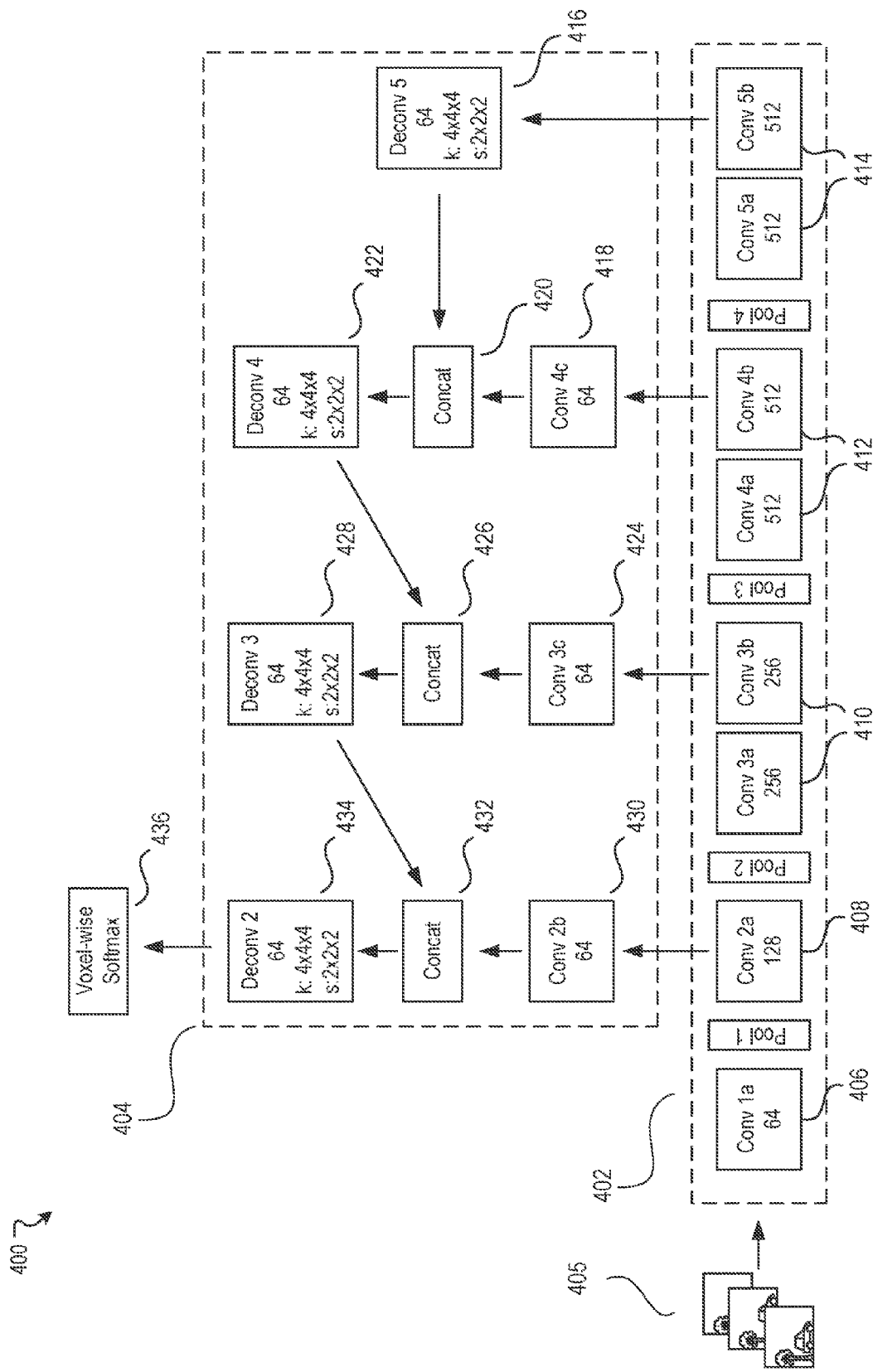
FIG. 4 illustrates another example diagram of a convolutional neural network, according to an embodiment of the present disclosure.

FIG. 4 illustrates another example diagram of a convolutional neural network 400, according to an embodiment of the present disclosure. In this example, the convolutional neural network 400 includes a first component 402 and a second component 404. The first component 402 can include a set of two-dimensional convolutional layers and a set of three-dimensional convolutional layers, as described in reference to FIG. 3. The second component 404 can include a set of three-dimensional de-convolutional layers, as described in reference to FIG. 3. The first component 402 of the convolutional neural network 400 can receive as input a set of frames having a certain size (i.e., resolution). In this example, the set of frames have a height of 100 pixels and a width of 100 pixels (i.e., 100×100 pixels). As mentioned, the size of the frames can reduce as convolutional operation(s) are performed by the different layers of the convolutional neural network 400. The size reduction typically occurs at the pooling layer and the amount of reduction can vary depending on the pooling parameters. In this example, after forward propagation of the frames through a first layer 406 and corresponding pooling layer, the size of the frames can be reduced from 100×100 pixels to 50×50 pixels. Similarly, after forward propagation of the frames through a second layer 408 and corresponding pooling layer, the size of the frames can be reduced from 50×50 pixels to 25×25 pixels. Next, after forward propagation of the frames through the third layers 410 and corresponding pooling layer, the size of the frames can be reduced from 25×25 pixels to 12×12 pixels. Finally, after forward propagation of the frames through the fourth layers 412 and corresponding pooling layer, the size of the frames can be reduced from 12×12 pixels to 6×6 pixels.

Next, the second component 404 can be utilized to perform de-convolution operations to various outputs from the first component 402, thereby causing the various outputs to be upsampled (e.g., by doubling the sizes of the respective outputs). In the example of FIG. 4, the output from the fifth layers 414 of the first component 402 of the convolutional neural network 400 is inputted to a first de-convolutional layer 416 that performs one or more de-convolutional operations to upsample the output from the fifth layers 414. In this example, the first de-convolutional layer 416 upsamples the output from the fifth layers 414, which is 6×6 pixels in size, to 64 channels that are each 12×12 pixels in size. In some embodiments, the output from the fourth layers 412 can be inputted to another layer 418 that performs one or more convolutional operations to produce 64 channels that are each 12×12 pixels in size. Next, the output from the layer 418, which is 64 channels that are each 12×12 pixels in size, can be concatenated 420 with the output from the first de-convolutional layer 416, which has been upsampled to 64 channels that are each 12×12 pixels in size. In this example, after concatenation, there will be 128 channels that are each 12×12 pixels in size. This concatenated output of 128 channels that are each 12×12 pixels in size can be inputted to a second de-convolutional layer 422 that performs one or more de-convolutional operations to upsample the concatenated output 420 from 128 channels of 12×12 pixels in size to 64 channels of 25×25 pixels in size.

In some embodiments, the output from the third layers 410 can be inputted to another layer 424 that performs one or more convolutional operations to produce 64 channels that are each 25×25 pixels in size. Next, the output from the layer 424, which is 64 channels that are each 25×25 pixels in size, can be concatenated 426 with the output from the second de-convolutional layer 422, which has been upsampled to 64 channels that are each 25×25 pixels in size. In this example, after concatenation, there will be 128 channels that are each 25×25 pixels in size. This concatenated output of 128 channels that are each 25×25 pixels in size can be inputted to a third de-convolutional layer 428 that performs one or more de-convolutional operations to upsample the concatenated output 426 from 128 channels of 25×25 pixels in size to 64 channels of 50×50 pixels in size.

In some embodiments, the output from the second layer 408 can be inputted to another layer 430 that performs one or more convolutional operations to produce 64 channels that are each 50×50 pixels in size. Next, the output from the layer 430, which is 64 channels that are each 50×50 pixels in size, can be concatenated 432 with the output from the third de-convolutional layer 428, which has been upsampled to 64 channels that are each 50×50 pixels in size. In this example, after concatenation, there will be 128 channels that are each 50×50 pixels in size. This concatenated output of 128 channels that are each 50×50 pixels in size can be inputted to a fourth de-convolutional layer 434 that performs one or more de-convolutional operations to upsample the concatenated output 432 from 128 channels of 50×50 pixels in size to 64 channels of 100×100 pixels in size. The upsampled output of 100×100 pixels in size can be inputted to a softmax layer 436 to be normalized. As mentioned, the loss function utilized by the softmax layer 436 can vary depending on the task for which the convolutional neural network 400 is trained to perform. Depending on the implementation, such tasks may involve predicting, for each voxel, or at least a portion of the voxels, corresponding to the video content 405, respective semantic segmentations (e.g., video feature descriptors), optical flow (e.g., direction of movement and/or magnitude of the direction), or depth recognition, to name some examples. The number of filters, pooling operations, and/or convolutional operations can vary and be specified depending on the implementation. Similarly, frame sizes, filter sizes, pooling sizes, and stride values can vary and be specified depending on the implementation. Furthermore, the number of descriptors can vary and be specified depending on the implementation.

Figure 5:
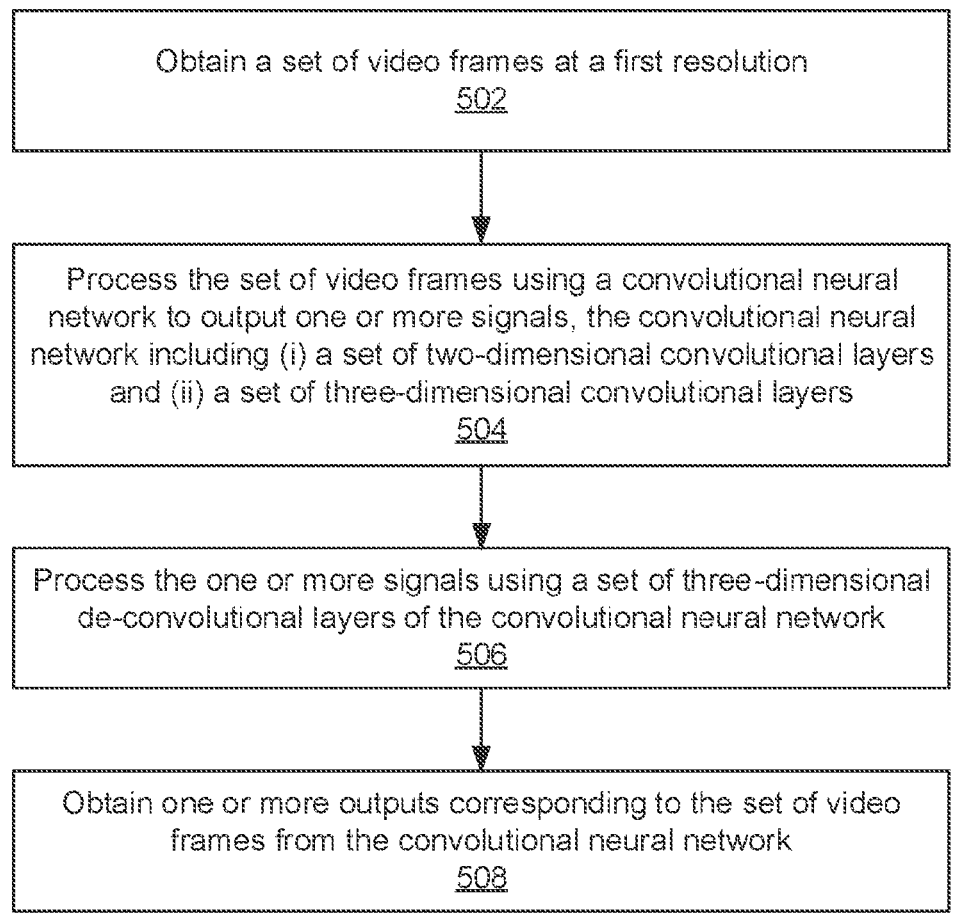
FIG. 5 illustrates an example method for processing a set of video frames using the convolutional neural network, according to an embodiment of the present disclosure.

FIG. 5 illustrates an example method 500 for processing a set of video frames using the convolutional neural network, according to an embodiment of the present disclosure. It should be appreciated that there can be additional, fewer, or alternative steps performed in similar or alternative orders, or in parallel, within the scope of the various embodiments unless otherwise stated. At block 502, the example method 500 can obtain a set of video frames at a first resolution. At block 504, the example method 500 can process the set of video frames using a convolutional neural network to output one or more signals, the convolutional neural network including (i) a set of two-dimensional convolutional layers and (ii) a set of three-dimensional convolutional layers. The processing can cause the set of video frames to be reduced to a second resolution. At block 506, the method 500 can process the one or more signals using a set of three-dimensional de-convolutional layers of the convolutional neural network. A block 508, the method 500 can obtain one or more outputs corresponding to the set of video frames from the convolutional neural network.

Figure 6:
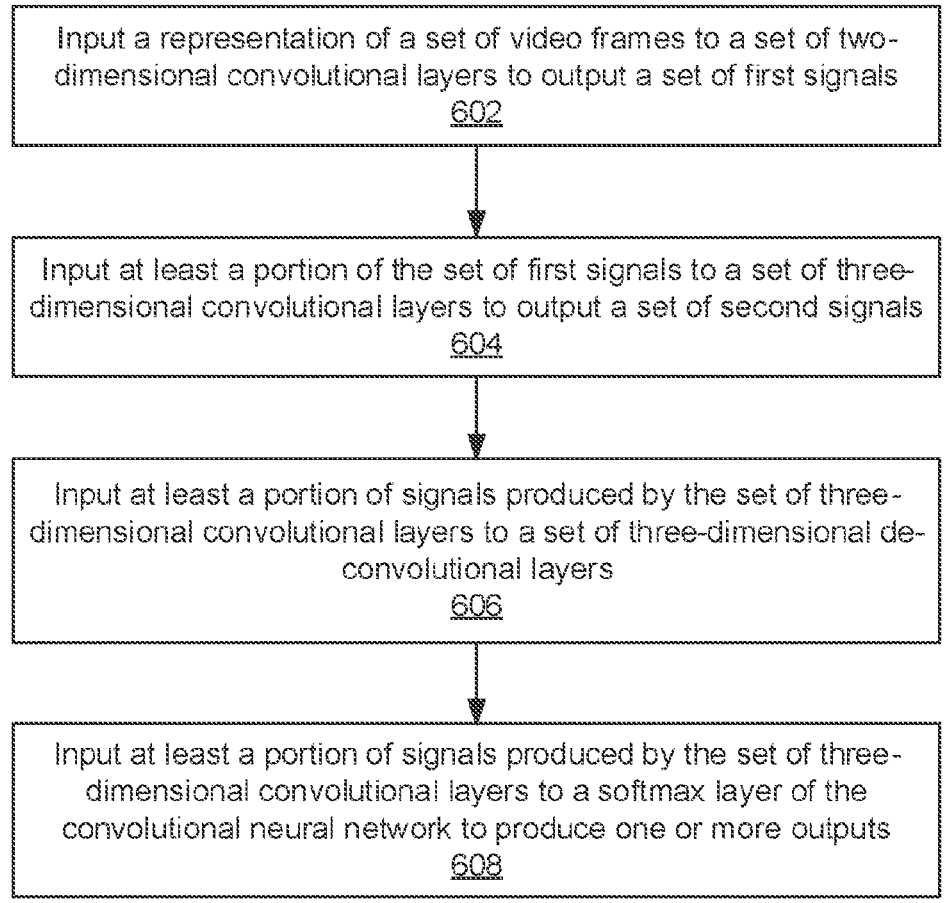
FIG. 6 illustrates another example method for processing a set of video frames using the convolutional neural network, according to an embodiment of the present disclosure.

FIG. 6 illustrates another example method 600 for processing a set of video frames using the convolutional neural network, according to an embodiment of the present disclosure. Again, it should be understood that there can be additional, fewer, or alternative steps performed in similar or alternative orders, or in parallel, within the scope of the various embodiments unless otherwise stated. At block 602, the example method 600 can input a representation of a set of video frames to a set of two-dimensional convolutional layers to output a set of first signals. The two-dimensional convolutional layers cab be trained to apply at least one two-dimensional convolutional operation to the representation of the video content. At block 604, the method 600 can input at least a portion of the set of first signals to a set of three-dimensional convolutional layers to output a set of second signals. The three-dimensional convolutional layers can be trained to apply at least one three-dimensional convolutional operation to the set of first signals. At block 606, the method 600 can input at least a portion of signals produced by the set of three-dimensional convolutional layers to a set of three-dimensional de-convolutional layers, the three-dimensional de-convolutional layers being trained to apply at least one three-dimensional de-convolutional operation to the portion of signals. At block 608, the method 600 can input at least a portion of signals produced by the set of three-dimensional convolutional layers to a softmax layer of the convolutional neural network to produce one or more outputs.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
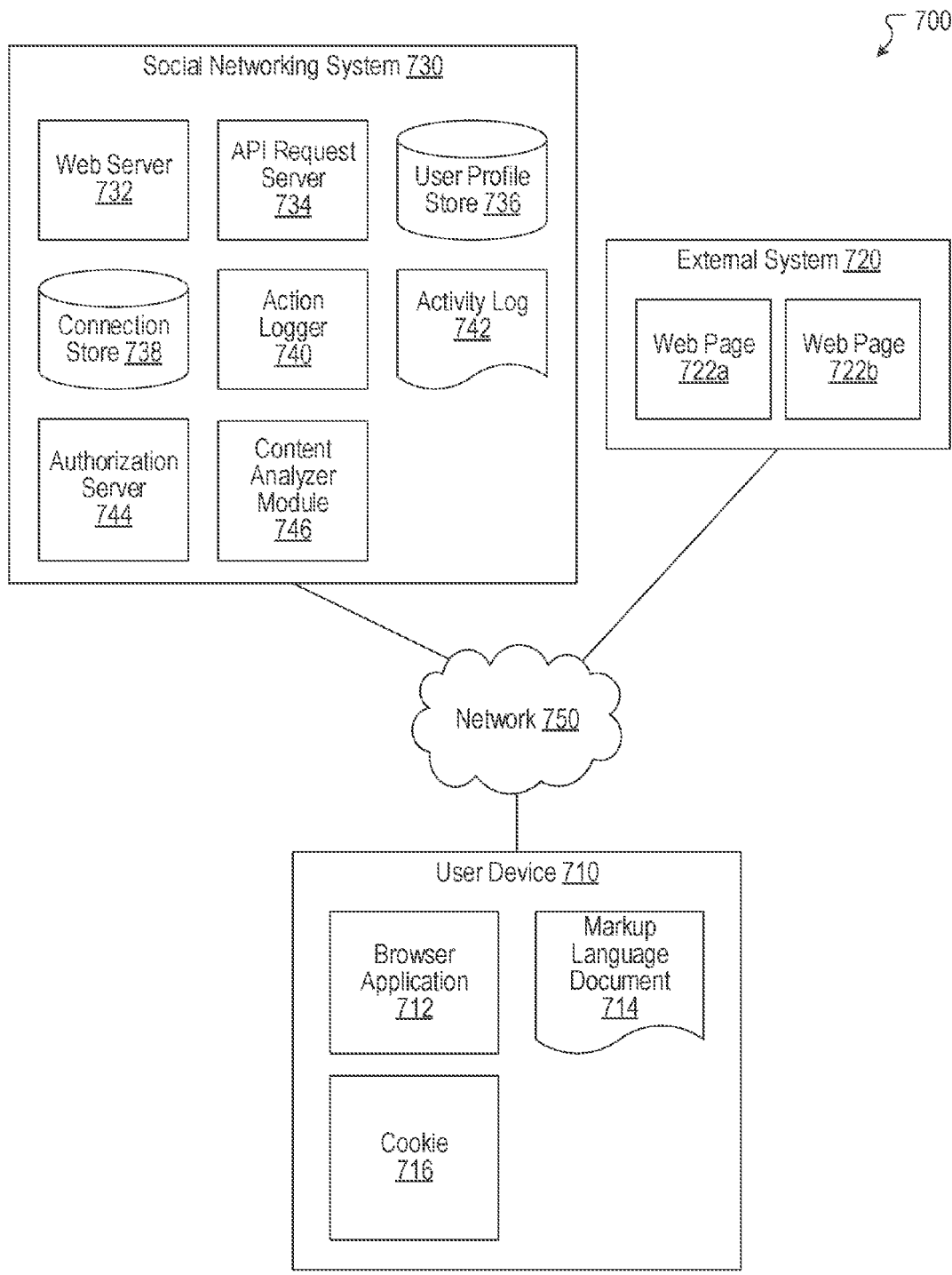
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a content analyzer module 746. The content analyzer module 746 can, for example, be implemented as the content analyzer module 102 of FIG. 1. As discussed previously, it should be appreciated that there can be many variations and other possibilities. Other features of the content analyzer module 746 are discussed herein in reference to the content analyzer module 102.

Hardware Implementation

Figure 8:
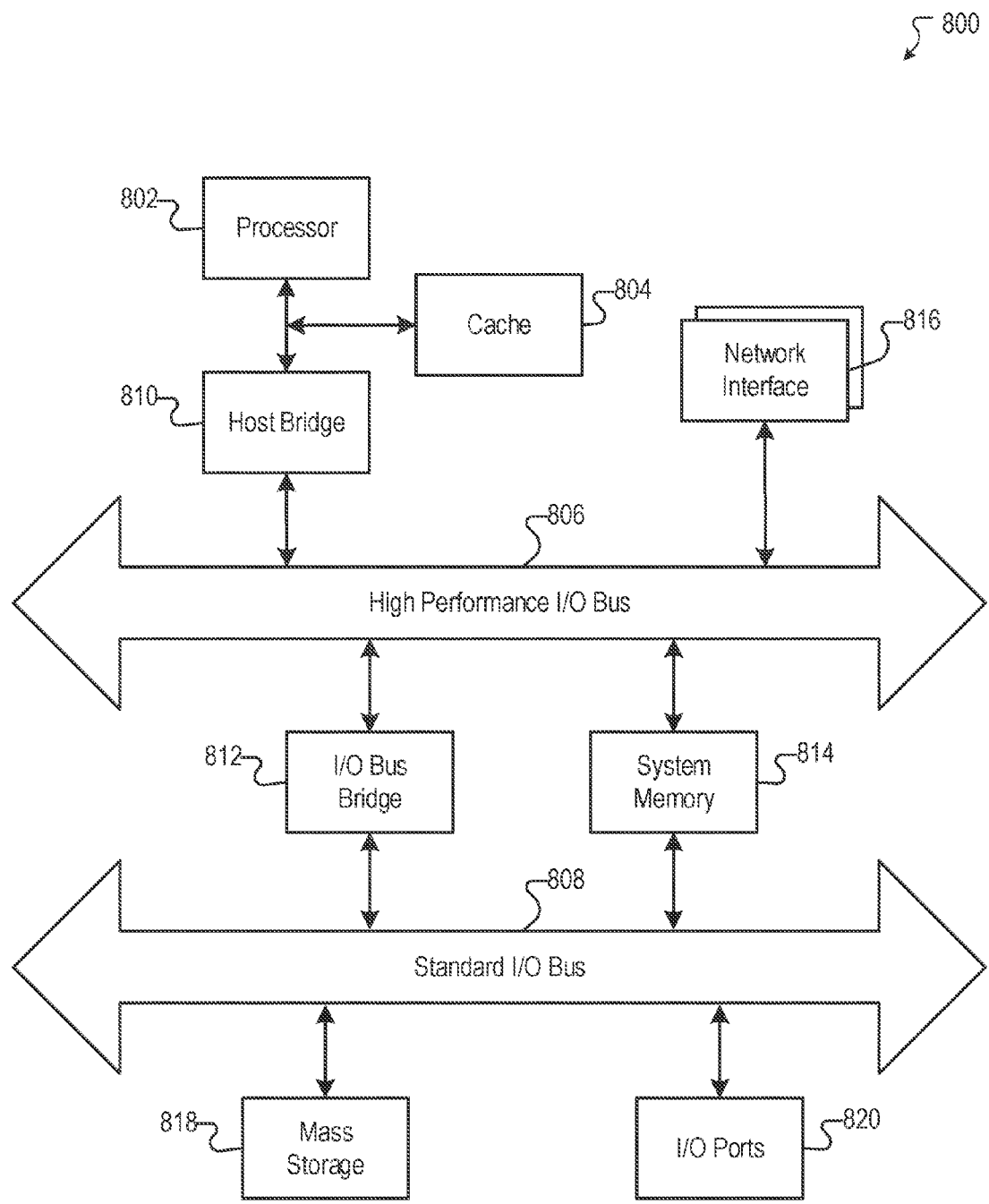
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to one embodiment", an embodiment", "other embodiments", one series of embodiments", some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   obtaining, by a computing system, a set of video frames at a first resolution;
   processing, by the computing system, the set of video frames using a convolutional neural network to output one or more signals corresponding to the set of video frames, the convolutional neural network including (i) a set of two-dimensional convolutional layers, (ii) a set of three-dimensional convolutional layers, and (iii) a set of three-dimensional de-convolutional layers, wherein the three-dimensional convolutional layers reduce the set of video frames to a second resolution, and wherein the three-dimensional de-convolutional layers upsample the set of video frames; and
   obtaining, by the computing system, the one or more outputted signals corresponding to the set of video frames from the convolutional neural network.

2. The computer-implemented method of claim 1, wherein obtaining the one or more outputs corresponding to the set of video frames further comprises:
   obtaining, by the computing system, one or more respective feature descriptors for one or more voxels in the set of video frames, wherein each feature descriptor references a recognized scene, object, or action.

3. The computer-implemented method of claim 1, wherein obtaining the one or more outputs corresponding to the set of video frames further comprises:
   obtaining, by the computing system, a respective optical flow for one or more voxels in the set of video frames, wherein the optical flow for a voxel describes at least a predicted direction and magnitude of the voxel.

4. The computer-implemented method of claim 1, wherein obtaining the one or more outputs corresponding to the set of video frames further comprises:
   obtaining, by the computing system, a respective depth measurement for one or more voxels in the set of video frames.

5. The computer-implemented method of claim 1, wherein processing the one or more signals using the set of three-dimensional de-convolutional layers of the convolutional neural network further comprises:
   inputting, by the computing system, at least a portion of signals produced by the set of three-dimensional convolutional layers to the set of three-dimensional de-convolutional layers, the three-dimensional de-convolutional layers being trained to apply at least one three-dimensional de-convolutional operation to the portion of signals.

6. The computer-implemented method of claim 5, wherein the at least one three-dimensional de-convolutional operation is based at least on one or more three-dimensional filters to de-convolve the portion of signals, and wherein the three-dimensional de-convolutional operation causes the representation of the video content to be increased in signal size.

7. The computer-implemented method of claim 1, wherein processing the set of video frames using the convolutional neural network to output one or more signals, further comprises:
inputting, by the computing system, a representation of the set of video frames to the set of two-dimensional convolutional layers to output a set of first signals, the two-dimensional convolutional layers being trained to apply at least one two-dimensional convolutional operation to the representation of the video content;
inputting, by the computing system, at least a portion of the set of first signals to the set of three-dimensional convolutional layers to output a set of second signals, the three-dimensional convolutional layers being trained to apply at least one three-dimensional convolutional operation to the set of first signals; and
inputting, by the computing system, at least a portion of the set of second signals to the set of three-dimensional de-convolutional layers to output a set of third signals, the three-dimensional de-convolutional layers being trained to apply at least one three-dimensional de-convolutional operation to the set of second signals.

8. The computer-implemented method of claim 7, wherein the at least one two-dimensional convolutional operation is based at least on one or more two-dimensional filters to convolve the representation of the video content, and wherein the two-dimensional convolutional operation causes the representation of the video content to be reduced in signal size.

9. The computer-implemented method of claim 7, wherein the at least one three-dimensional convolutional operation is based at least on one or more three-dimensional filters to convolve the set of first signals, and wherein the three-dimensional convolutional operation causes the representation of the video content to be reduced in signal size.

10. The computer-implemented method of claim 1, wherein the set of video frames includes more than two video frames.

11. A system comprising:
at least one processor; and
a memory storing instructions that, when executed by the at least one processor, cause the system to perform:
obtaining a set of video frames at a first resolution;
processing the set of video frames using a convolutional neural network to output one or more signals corresponding to the set of video frames, the convolutional neural network including (i) a set of two-dimensional convolutional layers, (ii) a set of three-dimensional convolutional layers, and (iii) a set of three-dimensional de-convolutional layers, wherein the three-dimensional convolutional layers reduce the set of video frames to a second resolution, and wherein the three-dimensional de-convolutional layers upsample the set of video frames; and
obtaining the one or more outputted signals corresponding to the set of video frames from the convolutional neural network.

12. The system of claim 11, wherein obtaining the one or more outputs corresponding to the set of video frames further causes the system to perform:
obtaining one or more respective feature descriptors for one or more voxels in the set of video frames, wherein each feature descriptor references a recognized scene, object, or action.

13. The system of claim 11, wherein obtaining the one or more outputs corresponding to the set of video frames further causes the system to perform:
obtaining a respective optical flow for one or more voxels in the set of video frames, wherein the optical flow for a voxel describes at least a predicted direction and magnitude of the voxel.

14. The system of claim 11, wherein obtaining the one or more outputs corresponding to the set of video frames further causes the system to perform:
obtaining a respective depth measurement for one or more voxels in the set of video frames.

15. The system of claim 11, wherein processing the one or more signals using the set of three-dimensional de-convolutional layers of the convolutional neural network further causes the system to perform:
inputting, by the computing system, at least a portion of signals produced by the set of three-dimensional convolutional layers to the set of three-dimensional de-convolutional layers, the three-dimensional de-convolutional layers being trained to apply at least one three-dimensional de-convolutional operation to the portion of signals.

16. A non-transitory computer-readable storage medium including instructions that, when executed by at least one processor of a computing system, cause the computing system to perform:
obtaining a set of video frames at a first resolution;
processing the set of video frames using a convolutional neural network to output one or more signals corresponding to the set of video frames, the convolutional neural network including (i) a set of two-dimensional convolutional layers, (ii) a set of three-dimensional convolutional layers, and (iii) a set of three-dimensional de-convolutional layers, wherein the three-dimensional convolutional layers reduce the set of video frames to a second resolution, and wherein the three-dimensional de-convolutional layers upsample the set of video frames; and
obtaining the one or more outputted signals corresponding to the set of video frames from the convolutional neural network.

17. The non-transitory computer-readable storage medium of claim 16, wherein obtaining the one or more outputs corresponding to the set of video frames further causes the computing system to perform:
obtaining one or more respective feature descriptors for one or more voxels in the set of video frames, wherein each feature descriptor references a recognized scene, object, or action.

18. The non-transitory computer-readable storage medium of claim 16, wherein obtaining the one or more outputs corresponding to the set of video frames further causes the computing system to perform:
obtaining a respective optical flow for one or more voxels in the set of video frames, wherein the optical flow for a voxel describes at least a predicted direction and magnitude of the voxel.

19. The non-transitory computer-readable storage medium of claim 16, wherein obtaining the one or more outputs corresponding to the set of video frames further causes the computing system to perform:
  obtaining a respective depth measurement for one or more voxels in the set of video frames.

20. The non-transitory computer-readable storage medium of claim 16, wherein processing the one or more signals using the set of three-dimensional de-convolutional layers of the convolutional neural network further causes the computing system to perform:
  inputting, by the computing system, at least a portion of signals produced by the set of three-dimensional convolutional layers to the set of three-dimensional de-convolutional layers, the three-dimensional de-convolutional layers being trained to apply at least one three-dimensional de-convolutional operation to the portion of signals.

* * * * *